United States Patent [19]

Daboub et al.

[11] 4,092,525

[45] May 30, 1978

[54] CODE READING APPARATUS

[75] Inventors: Henry A. Daboub, Dallas; Charles R. Henderson, Grand Prairie; Chris A. Balthrop, Bedford, all of Tex.

[73] Assignee: E-Systems, Inc., Dallas, Tex.

[21] Appl. No.: 683,981

[22] Filed: May 6, 1976

Related U.S. Application Data

[63] Continuation of Ser. No. 525,387, Nov. 20, 1974, abandoned.

[51] Int. Cl.² .................... G06K 7/10; G06K 9/00
[52] U.S. Cl. .................... 235/463; 340/146.3 K
[58] Field of Search ............ 235/61.11 E, 61.11 D, 235/61.7 B, 61.7 R, 61.6 E; 340/174.1 A, 174.3 Z, 146.3 K; 35/48 B; 250/568, 569, 570

[56] References Cited

U.S. PATENT DOCUMENTS

| | | | |
|---|---|---|---|
| 3,341,691 | 9/1967 | Modersohn | 235/61.11 E |
| 3,628,031 | 12/1971 | Azure | 250/569 |
| 3,643,066 | 2/1972 | Coliz | 235/61.11 E |
| 3,716,699 | 2/1973 | Eckert | 235/61.11 E |
| 3,723,710 | 3/1973 | Crouse | 235/61.11 E |
| 3,727,202 | 4/1973 | Fort | 340/174.1 A |
| 3,763,351 | 10/1973 | Deerhake | 235/61.11 E |
| 3,854,035 | 12/1974 | Tyler | 235/61.11 E |

*Primary Examiner*—Robert M. Kilgore
*Attorney, Agent, or Firm*—Robert V. Wilder

[57] ABSTRACT

Bar codes imprinted or otherwise applied to an object are read and decoded by focusing light reflected from the code by means of an objective lens to an image intensifier tube. Light energy reflected from the code impinges on the photo cathode of the image intensifier tube thereby causing an electron beam to generate a display on a phosphor screen with the electron beam deflected to center the code image on the phosphor screen. A fiber optic array channels light from the phosphor screen to an array of zones of photo sensors each zone having an output coupled to a correlation circuit. Output voltages from the correlation circuits are simultaneously coupled to acquisition, tracking and reading logic. Initially, upon detecting the presence of a code on an object, the acquisition and tracking logic responds thereto to produce deflection voltages to the image intensifier tube to provide centering on the phosphor screen. Outputs from the correlation circuits are coupled to reading logic to generate an output waveform representative of the bar coded data.

16 Claims, 16 Drawing Figures

CODE READING APPARATUS

This is a continuation of application Ser. No. 525,387, filed Nov. 20, 1974, now abandoned.

BACKGROUND OF THE INVENTION

This invention relates to electro-optical readers and more particularly to correlation circuits for use in bar code readers.

There has recently developed a need to quickly and accurately identify an object for purposes of location, sortation and routing. For example, with the ever increasing volume of letter mail there is a need for rapid and accurate mechanical identification and sorting to insure rapid and accurate mail delivery. Document identification and sortation is also becoming a significant problem in many industries such as banking and insurance wherein a significant volume of paper work must be processed daily on a reliable basis. The quick and accurate interpretation of data manifestations has also become important in fields where returnable media are utilized, such as the moving stock of railroads. Also, in the warehousing industry there is developing a need to quickly and accurately identify the location of stored items for retrieval thereof.

Commonly, the objects mentioned above are encoded in an optically-sensible bar code that requires appropriate code recognition equipment for the interpretation thereof.

Various systems are available for applying coded data to a document such as standard bar code printers and ink jet printers. The quality of such printing varies considerably such that in the worst case and under high magnification the coded data appears like a random splattering of ink droplets. The many methods and means for applying the coded data to carriers, together with the working environments to which the data bearing carriers are subject, provide a myriad of sources which have a degrading effect on the quality and readability of the encoded data. Those sources provide data bearing carriers having low print-contrast ratio, low reflectance of envelopes, poor bar print quality, bar to bar variation in quality, contrast and spacing, and voids within the bars as well as extraneous ink between bars. Most prior art code readers have had a common disadvantage in that they are not effective to consistantly and accurately translate encoded data of a substandard quality.

SUMMARY OF THE INVENTION

It is therefore an object of the present invention to provide a code reader which obviates the disadvantages of prior art devices.

It is another object of the present invention to provide a new and improved correlation circuit for use in an electro-optical code reading device.

It is a further object of the present invention to provide a code reading device as set forth which operates effectively over a wide range of code quality.

It is yet another feature of the present invention to provide a new and improved electro-optical bar code information reading device utilizing detection circuitry providing for a minimum of sensitivity to noise signals generated by coded information having poor quality.

In accomplishing these and other objects, there is provided, in accordance with the present invention, a bar code reading device, which, in response to a sensed bar code, generates first, second and third sequentially phase-displaced electrical signals. The first and third electrical signals are combined by a first circuit means to provide a combination signal. A second circuit means responds to the combination signal and the second electrical signal to provide an output signal representative of the bar code.

BRIEF DESCRIPTION OF THE DRAWINGS

Other and further features and advantages of the present invention will be apparent from the following description when read in connection with the accompanying drawings in which.

DESCRIPTION OF THE PREFERRED EMBODIMENTS

Figure 1:
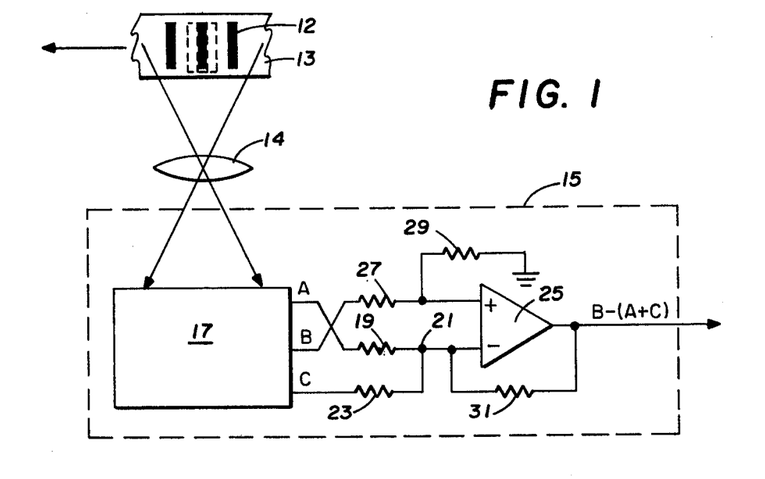
FIG. 1 is a schematic diagram of one embodiment of the present invention.

Referring to FIG. 1, there is shown encoded data 12 carried by an object 13 in a direction as indicated. An objective lens means 14 directs the energy from the encoded data 12 toward a preferred embodiment of a recognition apparatus 15. The recognition apparatus 15 includes a reading means 17 upon which an image of the encoded data 12 is formed. The reading means 17 provides first, second and third electrical signals A, B, and C, respectively. The first electrical signal A is applied to a resistor 19 to a common point 21. Likewise, the third electrical signal C is applied to the common point 21 through a resistor 23. The common point 21 is connected to an inverting input terminal of the differential amplifier 25. The second electrical signal B is applied through a resistor 27 to the non-inverting input terminal of the amplifier 25. The non-inverting input terminal of the amplifier 25 is also connected to ground through a resistor 29. A feedback resistor 31 connects the output terminal of the amplifier 25 with its inverting input terminal. The output signal from the differential amplifier 25 provides the output signal for the recognition apparatus 15.

Figure 2A:
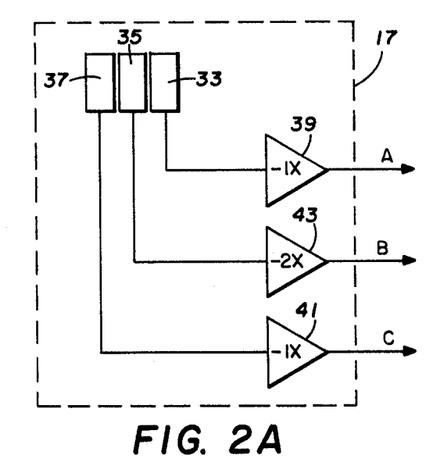
FIGS. 2A and 2B are schematic diagrams illustrating specific element arrangements of one of the components in FIG. 1.

The arrangement of elements in a preferred embodiment of the reading means 17 in FIG. 2A shows first, second and third light sensing devices 33, 35, and 37, respectively. Those light sensing devices may be either photovoltaic elements or photoresistive elements. In the present example, the data signal output from each of the light sensing devices increases in direct proportion to the intensity of the light impinging thereon. An amplifier 39 substantially inverts the data signal received from the first light sensing device 33 to provide the first electrical signal A. Similarly, an amplifier 41 substantially inverts the data signal received from the third light sensing device 37 to provide the third electrical signal C. The data signal provided by the second light sensing device 35 is inverted by an amplifier 43 which also amplifies that data signal by a factor of two with respect to the first and third data signals to provide the second electrical signal E.

Figure 2B:
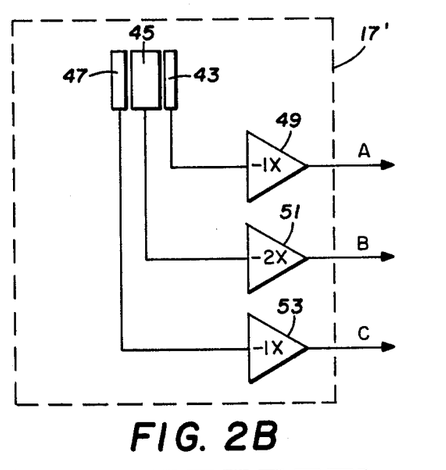

FIG. 2B shows another arrangement 17' of the reading means 17 of FIG. 1. In FIG. 2B, first, second and third light sensing devices 43, 45 and 47, respectively, receive energy from the encoded data 12. The area of each of the first and third light sensing devices 43 and 47 is substantially one-half of the second or central light sensing device 45. Data signals from the light sensing devices 43, 45 and 47 are inverted by amplifiers 49, 51, and 53, respectively, to provide the first, second and third electrical signals A, B and C.

Figure 3A:
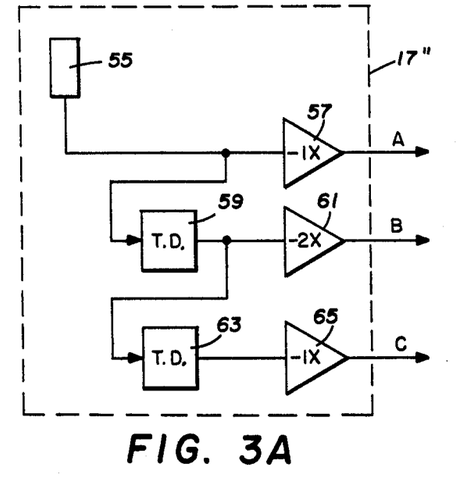
FIGS. 3A and 3B are schematic diagrams illustrating other specific element arrangements of one of the components of FIG. 1.
Figure 3B:
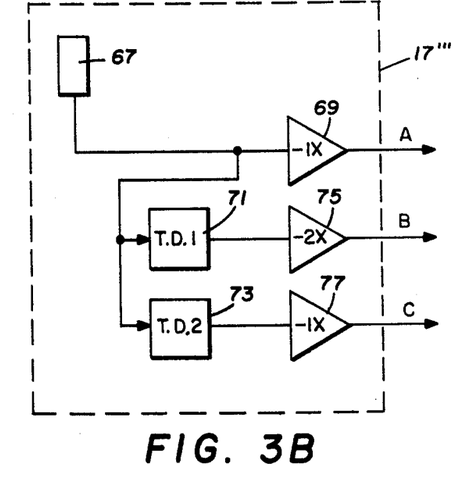

FIGS. 3A and 3B show still further arrangements of the reading means or circuit 17 of FIG. 1. In FIG. 3A the data signal from a single light sensing device 55 is inverted by an amplifier 57 of the reading means 17" to provide the first electrical signal A. The data signal from the single light sensing device is also applied to a first time delay circuit 59. The data signal output from the first time delay circuit 59 is amplified by a factor of two and inverted by an amplifier 61, the output signal from which is the second electrical signal B. The data signal output signal from the first time delay circuit 59 is also applied to a second time delay circuit 63. The second time delay circuit 63 provides a data signal which is inverted by an amplifier 65 which in turn provides the third electrical signal C.

In the arrangement 17''' of the reading means 17 of FIG. 1, the single light sensing device 67 provides a data signal for application to amplifier 69, a first time delay circuit 71 and a second time delay circuit 73. The data signal output from the first time delay circuit 71 is applied to an amplifier 75 and the data signal output from the second time delay circuit 73 is applied to an amplifier 77. The amplifiers 69, 75 and 77 invert the data input signals thereto to provide the first, second and third electrical signals A, B and C, respectively. The amplifier 75 amplifies its input by a factor twice the amplification factor of amplifiers 69 and 77.

Figure 4A:
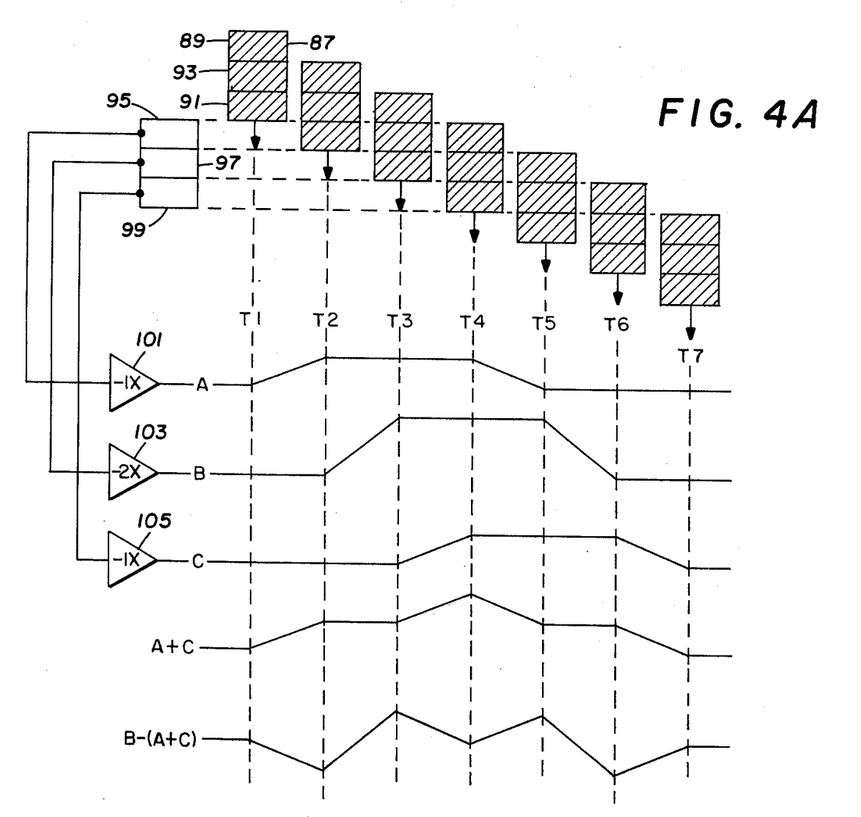
FIGS. 4A-4B are schematic diagrams helpful in explaining the operation of the present invention.

In FIG. 4A, three light sensitive areas 95, 97 and 99 are arranged to respond to the encoded data 87. Output signals from the three light sensitive areas 95, 97 and 99 are applied to three inverting amplifiers 101, 103 and 105, respectively. The outputs from the amplifiers 101, 103 and 105 provide the output signals A, B and C, respectively. Before the time T1 the encoded data 87 is without the field of view of any of the light sensitive areas 95, 97 and 99, and the output signals A, B and C remain at a predetermined level. Between times T1 and T2, the first area 91 of the encoded data 87 engulfs the field of view of the first light sensitive area 95 and the output signal A will increase as shown. Thereafter, the signal A will remain the same until between times T4 and T5 when the final area 89 of encoded data 87 leaves the field of view of the first light sensitive area 95, and the output signal A will decrease to its predetermined level. The amplifier 103 which is connected to the second light sensitive area 97 will provide the second electrical signal B at twice the magnitude of the signal sensed at the light sensitive area 97. The signal B will therefore increase between the times T2 and T3 to a value twice that to which the signal A increased between the times T1 and T2. Between times T5 and T6 when the final area 89 of the encoded data 87 leaves the field of view of the second light sensitive area 97, the output signal B will decrease back to its predetermined level. Output signal C is substantially the same as the output signal A except because of its physical position with respect to the encoded data 87 it is phase-displaced from the output signal A. The output signal C will increase between the times T3 and T4 and decrease back to its predetermined level between the times T4 and T5. The correlation circuitry shown in FIG. 1 will add the output signals A and C and subtract that sum from the output signal B as shown in FIG. 4A. It is apparent that a threshold circuit may readily detect the two positive going pulses in the signal B−(A+C) thus detecting the bar codes at areas 89 and 91 of the encoded data 87. The increment of time sequentially displacing the signals A, B and C is equal to the bar-to-bar spacing divided by twice the relative speed of the encoded data with respect to the reading station.

Figure 4B:
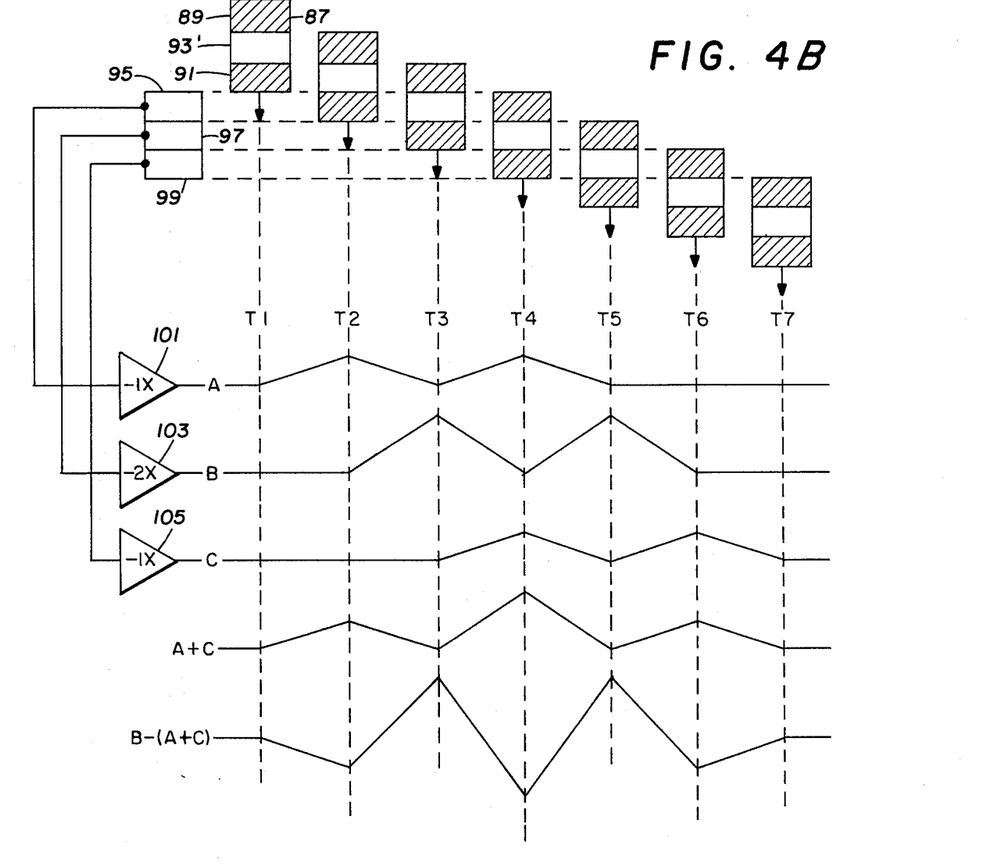

FIG. 4B illustrates the signals provided by the present invention when there is a space in the area 93' between the bars 89 and 91.

Although FIGS. 4A and 4B illustrate the operation of the present invention with reference to the arrangement shown in FIG. 2A, the arrangements of the reading means 17 of FIG. 1 which are shown in FIGS. 2B, 3A and 3B, function similarly to provide substantially similar results. Several embodiments of the present invention have been disclosed and described in connection with FIGS. 1-3, and the present invention may be implemented as shown to provide a reading apparatus capable of accurately reading a bar coded format even when the quality of the bar code print is substandard. Beginning with FIG. 5 there is shown a more sophisticated reading system which utilizes centering techniques. The reading system beginning with FIG. 5 is included to show the ease with which the present invention may be incorporated therein to improve the overall system accuracy.

Figure 5:
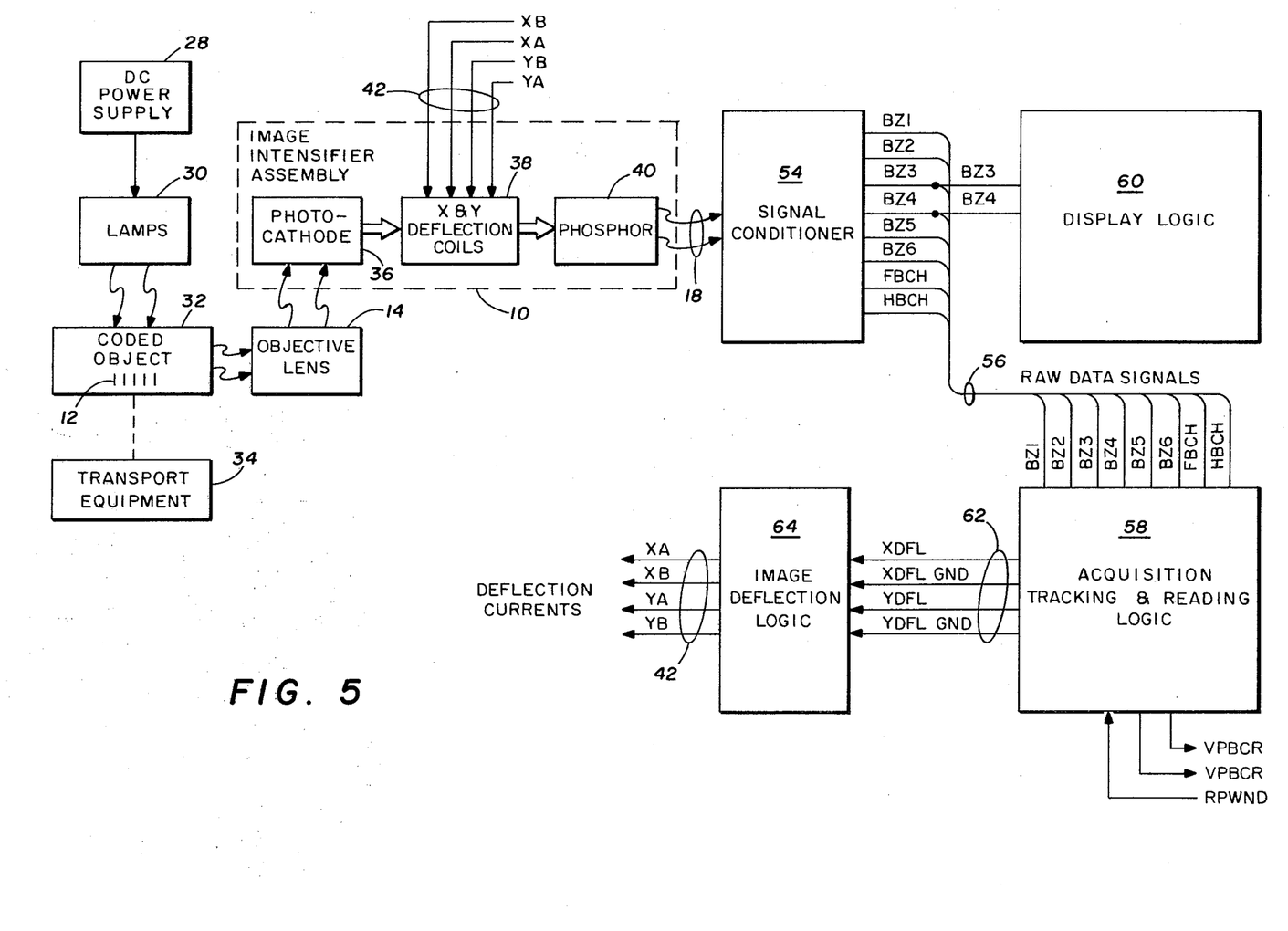
FIG. 5 is a block diagram showing in detail the major blocks of a code reader embodying the present invention and particularly illustrating in block form a signal conditioner, an acquisition, tracking and reading system, and an image deflection system.

Referring to FIG. 5, an electro-optical bar code reader utilizes an image intensifier tube 10 to relay both visible and near infrared energy reflected from an object and a code 12 comprising full bar codes and half bar codes all carried by the object.

A power supply 28 is connected to energize an array of lamps 30 for illuminating the window area of an object 32 carrying the bar code 12. Transport equipment 34 imparts a motion to the object 32 past the illuminated area produced by the lamps 30.

Light reflected from the bar code 12 is focused by means of the objective lens 14 on a photo cathode 36 of the image intensifier tube 10. Electrons emitted from the photo cathode 36 are transmitted through deflection coils 38 and impinge on a phosphor screen 40 at the end of the tube 10 opposite from the photo cathode 36. The deflection coils 38 are energized by deflection voltages on lines 42 to deflect the electron beam from the photo cathode 36 in both the X and Y directions. By selective energizing of the deflection coils 38, the bar code 12 may appear anywhere within a scanning window area such that the objective lens 14 focuses the reflected lightwave energy to the photo cathode 36. By varying the deflection voltage to the coils 38, the electron beam is positioned in a desired target area of the phosphor screen 40.

The image intensifier tube 10 is an electron device which reproduces a picture of the bar code 12 on a phosphor screen, the picture being identical to, and often much brighter than, the original image on the photo cathode positioned in the tube at the point of incoming lightwave energy. All image intensifier tubes have a photo cathode which emits electrons in the same density pattern as the illumination falling on the incoming surface of the tube. These electrons are accelerated to, and focused on, the phosphor screen by an accelerating voltage and an electromagnetic coil, surrounding the tube, is energized to deflect the electron beam within the tube to thereby provide a means for accurately positioning the target reproduction on the phosphor screen. The electrons strike and excite the phosphor screen which emits light thereby reproducing the code impinging on the photo cathode.

An objective lens 14 collects the reflected lightwave energy from the code 12 and the background area of the object on which it is printed, and focuses this energy on the photo cathode of the image intensifier tube 10.

Coupled to the image intensifier tube 10 at the phosphor screen end is a series of fiber optic bundles 18 coupled to a matrix of light responsive sensors within a signal conditioner 54. Typically, the light responsive sensors are either photo multipliers or photo diodes having a characteristic to generate a signal varying with lightwave energy impinging thereon.

Depending upon the application of the system of FIG. 5 and the quality of the bar code to be read, single fiber optic strands, either embedded in an epoxy or separated in a bundle of other fiber optic strands may be used to transmit lightwave energy from the intensifier tube 10 to the light responsive sensors.

Figure 6:
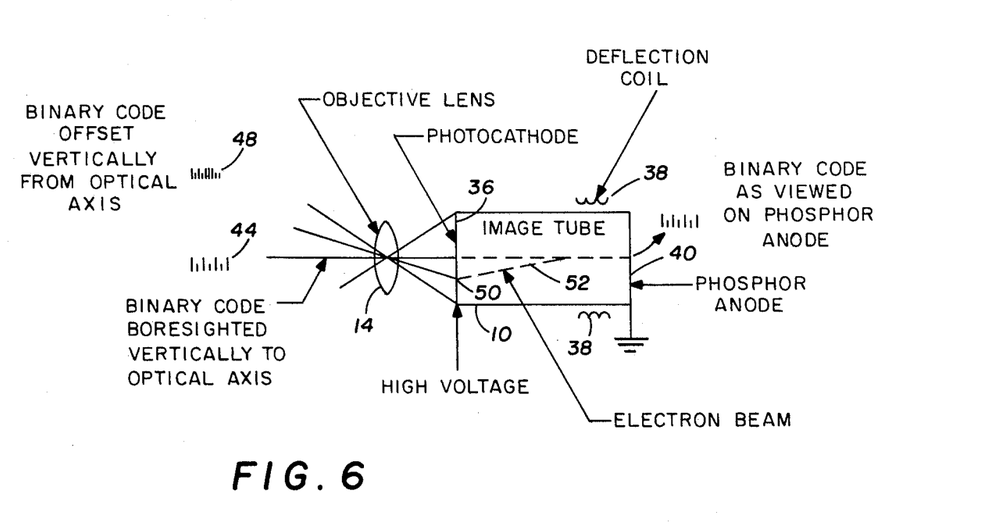
FIG. 6 is a schematic diagram of an image intensifier tube with deflection coils for electronic positioning of the target reproduction of an incoming image.

Referring to FIG. 6, there is schematically illustrated an image intensifier tube 10 with the object lens 14 directing light energy to the photo cathode 36. Assume that a first binary code as at 44 appears on the optical axis of the objective lens 14, then light reflected therefrom will impinge on the photo cathode 36 on the axis of the tube 10. An electron beam 46 emitting from the photo cathode will be directed axially through the tube 10 to impinge on the center of the phosphor screen 40. In this case, the deflection coils 38 remain deenergized and do not influence the path of the electron beam 46. Next, assume that a binary code 48 appears opposite from the vertical optical axis of the lens 14. In this case, light reflecting from the code 48 will impinge on the photo cathode 36 at a location 50 offset from the longitudinal axis of the tube 10. By properly energizing the deflection coils 38, an electron beam 52 emitting from the photo cathode 36 at the point 50 will be deflected onto the center of the phosphor screen 40. Thus, by properly energizing the deflection coils 38, the offset binary code 48 is made to appear at a preselected target area on the phosphor screen 40 the same as the bore-sighted binary code 44.

Returning to FIG. 5, light emitting from the phosphor screen 40 is transmitted through the fiber optic bundles 18 to a signal conditioner network 54. The signal conditioner network 54 generates raw data signals transmitted over communication lines 56 to acquisition, tracking and reading logic 58. Data from preselected scanning zones is also transmitted directly from the signal conditioner network 54 to display logic 60 for driving the display 24.

Raw data signals inputed to the logic 58 are directed to logic elements therein for generating deflection control on lines 62 to an image deflection network 64. Signals inputed to the logic 58 are also utilized to generate recognition pulses on the line 26 for control purposes or location as desired. The image deflection network utilizes the deflection control on the lines 62 to adjust deflection currents on lines 42 as coupled to the deflection coils 38 for positioning the target reproduction of the code 12 on the phosphor screen 40.

Figure 7:
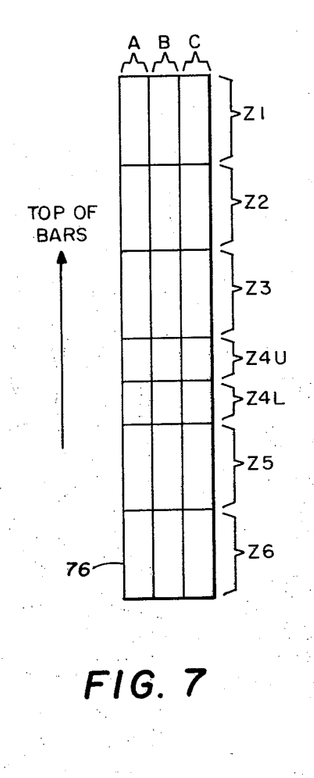
FIG. 7 is an illustration of scanning zones viewed by an image intensifier tube of the system of FIG. 5.

Referring to FIG. 7, there is illustrated a viewing window 76 comprising six scanning zones Z1–Z6 for covering the vertical extent of the viewing window. Each vertical scanning zone is divided into a code area designated in each case by the letter B, with background areas positioned on either side of the code area. The background areas are designated by A and C. Fiber optic bundles 18 couple the areas of the window 76 to corresponding right sensitive elements of FIGS. 8, 9 and 11.

Figure 8:
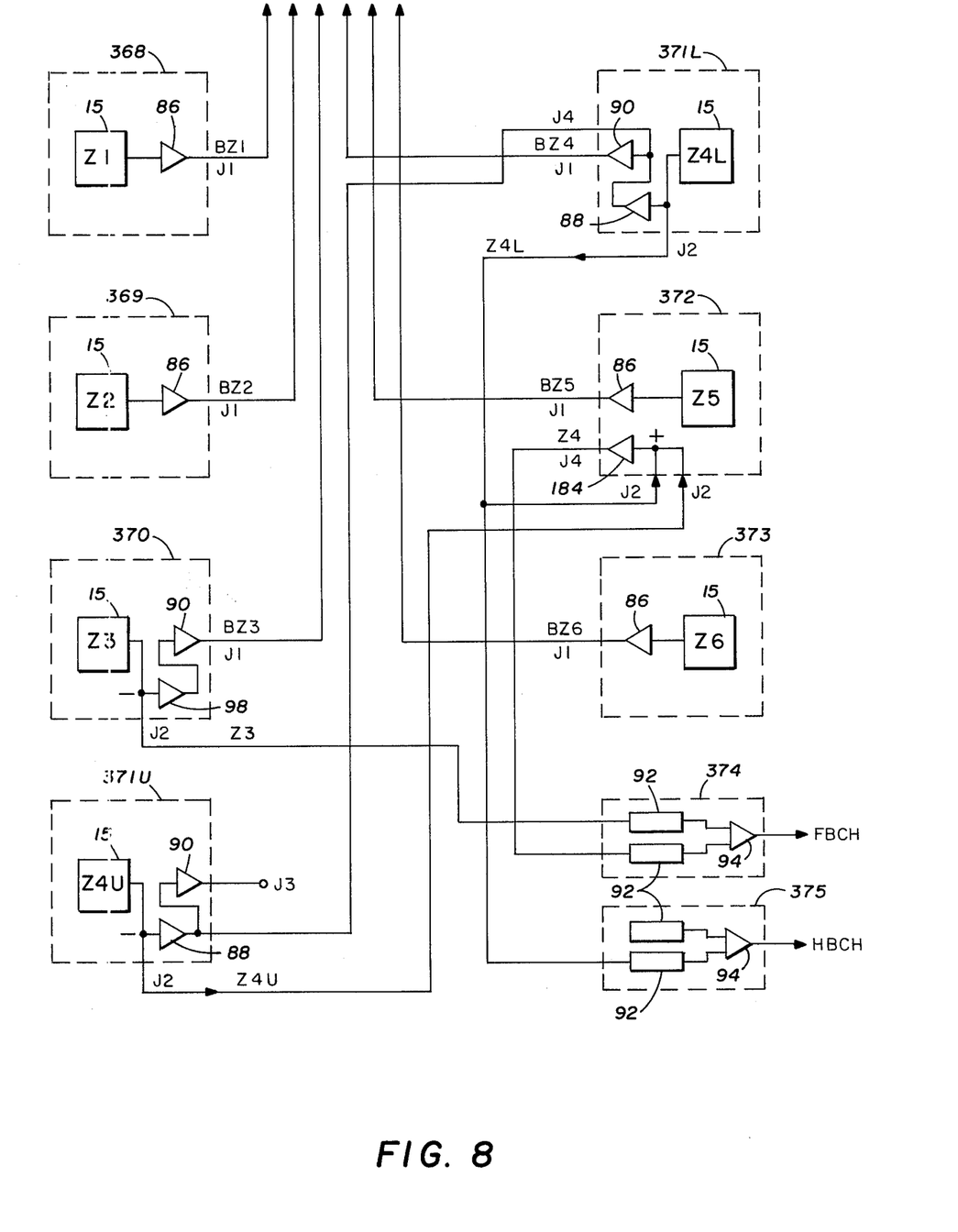
FIG. 8 is a block diagram of the individual comparator circuits for each of the scanning zones of FIG. 7.

Referring to FIG. 8, there is shown a block diagram of the comparators 368–375 showing the scanning zones connected to each. The comparators 368–375 comprise the signal conditioner 54 of FIG. 5. With reference to the scanning zone 4 of the window area 76, this is the primary reading zone and is divided into an upper and lower section Z4U and Z4L, respectively.

Each of the comparator networks 368–373 includes a recognition apparatus 15 such as shown in FIG. 1. In the comparators 368, 369, 372 and 373 the output of the recognition apparatus 15 is further amplified in an amplifier 86. In the comparators 370, 371U and 371L the output of the recognition apparatus 15 is tied to an amplifier 88, the output of the amplifier 88 is further amplified in an amplifier 90.

The output of the amplifiers 86, in the comparators 368, 369, 370, 372 and 373, comprises the raw data signals coupled to the acquisition, tracking and reading logic 58 (FIG. 5). In the comparator 371L, the output of the amplifier 90 comprises the raw data signals coupled to the logic 58 for zone 4. For the comparators 374 and 375, each includes peak detectors and pulse generating circuits 92 having outputs tied to inputs of an amplifier 94. The output of the amplifier 94 for the comparator 374 is a full bar centroid high (FBCH) signal and the output of the amplifier 94 from the comparator 375 is a half bar centroid high (HBCH) signal; both centroid signals are coupled to the logic 58.

Figures 9, 10:
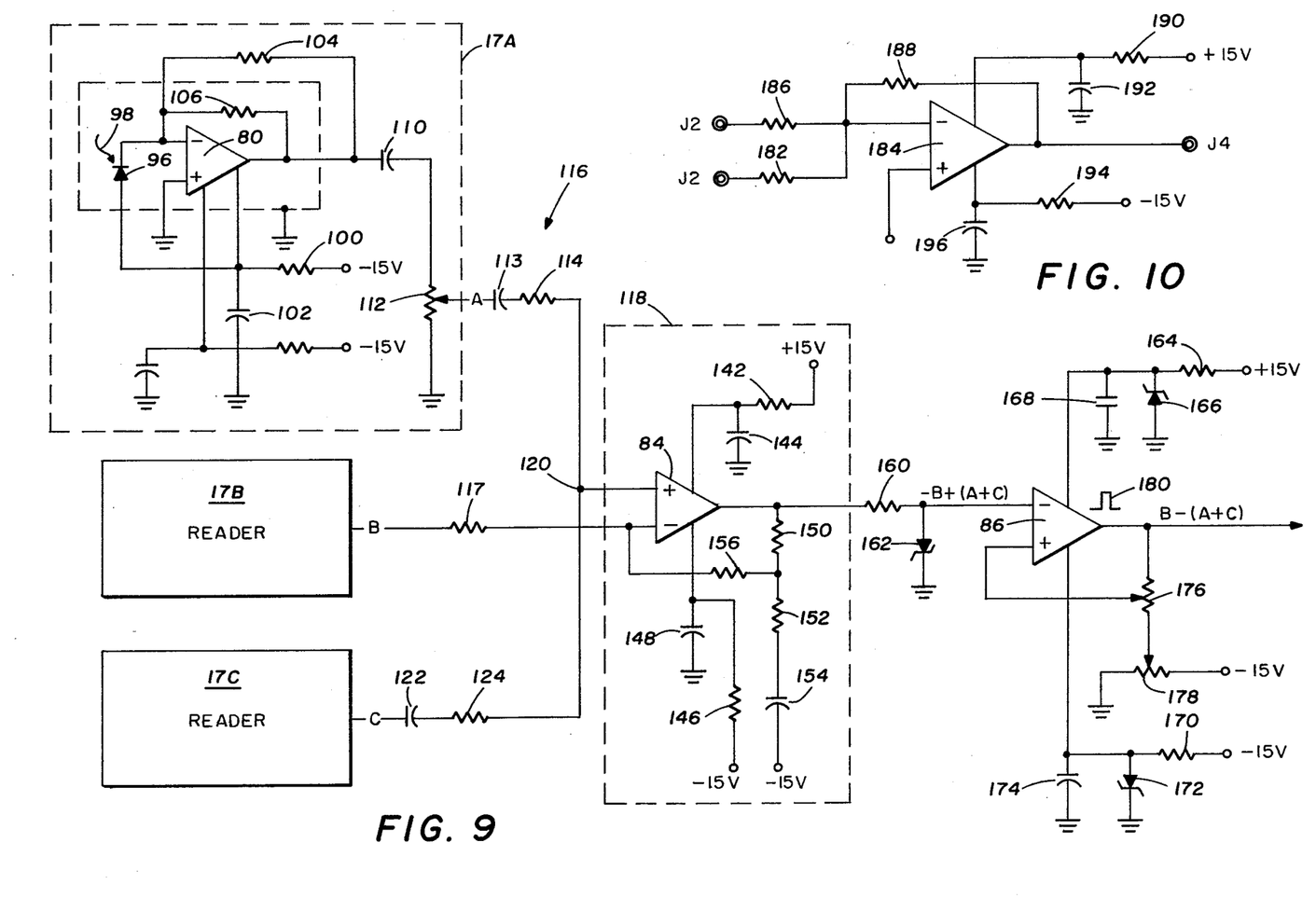
FIG. 9 is a schematic diagram of an amplifier-comparator bar code reader.
FIG. 10 is a schematic diagram of an amplifier which is an addition to the amplifier-comparator of FIG. 9 and outputs the clock from scanning zone 4 of FIG. 8.

Referring to FIG. 9, there is shown a schematic of the comparator circuits 368, 369 and 373, including reading means 17A, 17B and 17C, first circuit means generally indicated at 116 and second circuit means 118. Reading means 17B and 17C are similar in circuit configuration as reading means 17A, the three reading means being responsive to light at the three areas A, B and C, respectively of zones Z1, Z2 or Z6. Lightwave energy transmitted by the fiber optics from one of the A zones is directed to a photo diode 96 as indicated by the waveline 98. The cathode of the diode 96 is tied to the negative input of an amplifier 80 having a positive input terminal coupled to ground. Typically, the amplifier 80 and corresponding amplifiers in reading means 17B and 17C are Bell and Howell Models 509-50. A negative DC voltage is coupled to the amplifier 80 and to the anode of the diode 96 both through a resistor 100 which is also tied to ground through a capacitor 102. The output terminal of the amplifier 80 connects to a feedback loop including resistors 104 and 106 interconnected to the negative input terminal of the amplifer.

An output signal from the amplifier 80 is coupled through a capacitor 110 to a gain potentiometer 112. The wiper arm of the potentiometer 112 is connected through a capacitor 113 and a resistor 114 to a common point 120 which is, in turn, connected to a positive input terminal of the differential amplifier 84 of the second circuit means 118. Typically, the amplifier 84 is available from National Semiconductor, Model No. LM318. An output from the reading means 17C is connected through a series connection of a capacitor 122 and a resistor 124 to the common point 120. The output from reading means 17B is coupled through a resistor 117 to the inverting input terminal of the amplifier 84.

A positive DC voltage is applied to the amplifier 84 through a resistor 142 and a capacitor 144 and a negative DC voltage is coupled to the amplifier 84 through a resistor 146 and a comparator 148. The output terminal of the amplifier 84 is connected to a feedback loop including a divided network of resistors 150 and 152 in series with a capacitor 154. A feedback resistor 156 is interconnected between the junction of the resistors 150 and 152 and the negative input terminal of the amplifier.

An output from the amplifier 84 is applied through a resistor 160 to the negative input terminal of an amplifier 86. A Zener diode 162, also coupled to the negative input terminal of the amplifier 86, clamps the input of the amplifier 86 to a preselected level. A positive DC voltage is applied to the amplifier 86 through a resistor 164 also connected to a Zener diode 166 in parallel with a capacitor 168 regulating the voltage to a preset level. Similarly, a negative DC voltage is applied to the amplifier 86 through a resistor 170 also connected to a Zener diode 172 in parallel with a capacitor 174 maintaining the DC voltage at a preselected level.

The output terminal of the amplifier 86 is coupled to a hysteresis and threshold adjustment network comprising a potentiometer 176 and a potentiometer 178 with the wiper arm of the former coupled to the positive input terminal of the amplifier. The potentiometer 178 is connected to the negative terminal of a DC supply and to ground and has the wiper arm tied to the potentiometer 176. The output voltage of the amplifier 86 is a series of pulses as illustrated by the curve 180 with each pulse representing a full bar in a code sequence. Thus, as a bar code enters any one of zones Z1, Z2, or Z6 a pulse 180 is generated.

By connecting the background side areas A and C in a differential configuration with a central area B of the same zone, the system achieves improved noise rejection. The differential configuration of the amplifier 84 provides an output related to the relative difference between light impinging on the diodes 96 of reading means 17A and 17C with respect to light impinging on the light sensitive element of reading means 17B. With the light sensitive element or diode 96 of reading means 17A and 17C responsive to background reflected light and the diode 96 of reading means 17B responsive to a bar code reflected light, imperfections in the bar code tend to be rejected by the system. Thus, improved reliability in code detection and reading is possible.

Referring to FIG. 10, there is shown an amplifier circuit which is in addition to the circuit of FIG. 9 and when so combined represents a detail schematic of the network 372 for zone 5 of the window area 76. A voltage signal from the comparator circuit 371L is applied to an input resistor 182 tied to the negative input terminal of an amplifier 184 and a voltage signal from the comparator circuit 371U is applied through a resistor 186 to the same input terminal of the amplifier 184. Thus, voltages from the zones 4U and 4L are summed in the resistor network 182 and 186 and amplified in the amplifier 184.

Connected around the amplifier 184 to the negative input terminal is a feedback loop including a resistor 188. A positive DC voltage is connected to the amplifier 184 through a resistor 190 which is also connected to ground through a capacitor 192. A negative DC voltage is connected to the amplifier 184 through a resistor 194 having a connection to ground through a capacitor 196. Typically, the amplifier 184 is available from Fairchild Manufacturing Company, Model No. uA741. An output from the amplifier 184 is connected to the circuit 92 of circuit 374 as part of the system for generating the full bar centroid high signal.

Figure 11:
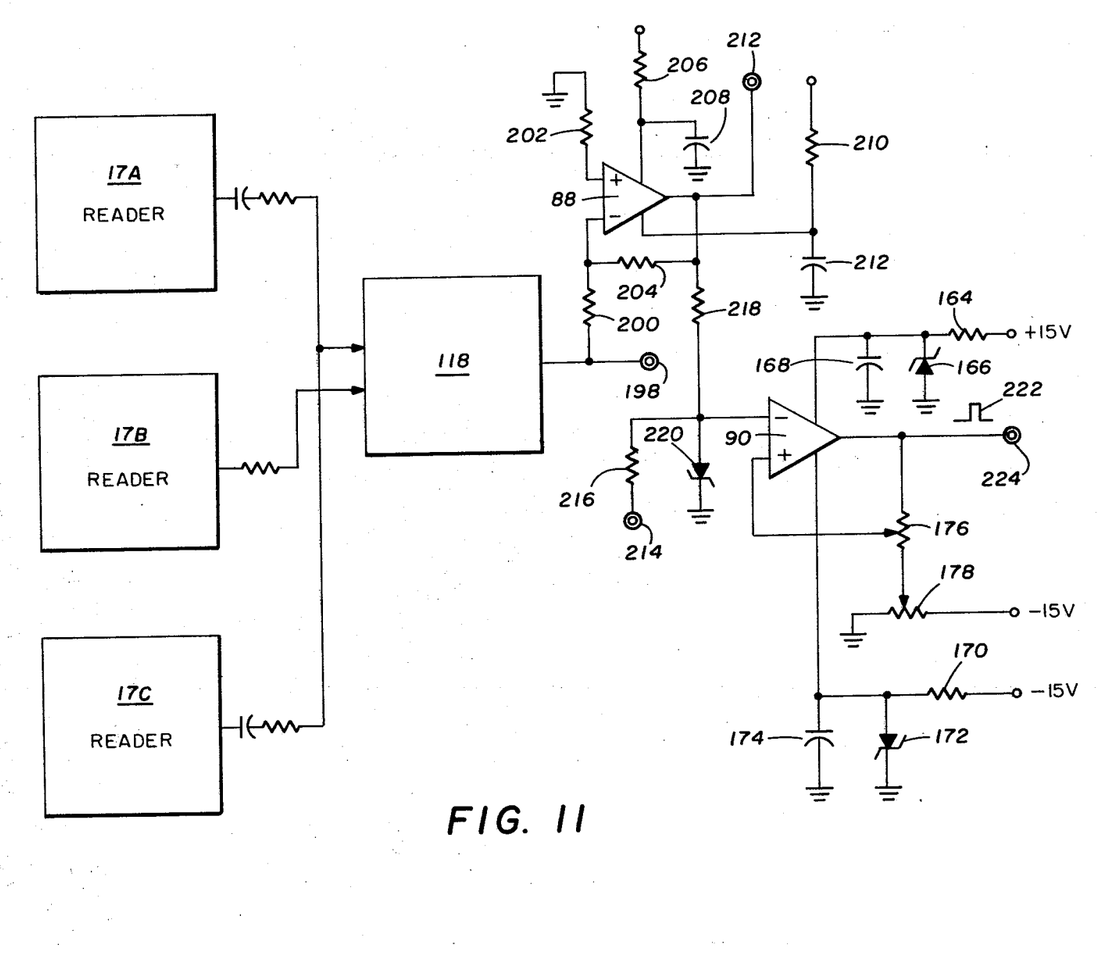
FIG. 11 is a schematic diagram of an amplifier-comparator bar code reader for scanning zones 3, 4U and 4L.

Referring to FIG. 11, there is shown a schematic of the comparator circuits 370, 371U and 371L for scanning zones Z3 and Z4U and Z4L of the window area 76. The input section of the circuit of FIG. 11 is similar to the input section of the circuit of FIG. 9, that is, circuitry associated with the amplifiers 80 and 84 is the same in FIGS. 9 and 11. This part of the circuit of FIG. 11 will not be detailed again and is shown in block form.

Light transmitted from the code area B of zones Z3, Z4U or Z4L impinges on the photo diode of the reading means 17B while light transmitted by the fiber optics 18 from the background areas A and C of zones Z3, Z4U or Z4L impinges on the photo diode of the reading means 17A and 17C, respectively. Output voltages of reading means 17A and 17C are summed or combined and that combination signal is differentially summed with the output voltage of the reading means 17B in the second circuit means 184 which includes amplifier 84. Amplifier 84 has an output coupled through a resistor 200 to the negative input terminal of the amplifier 88. The positive input terminal of the amplifier 88 is tied to ground through a resistor 202. A feedback path for the amplifier 88 includes a resistor 204 connected between the output of the amplifier and the negative input terminal. The amplifier 88 is supplied with a positive DC voltage through a resistor 206 also connected to a capacitor 208 for providing noise filtering. The amplifier 88 is also energized by a negative DC voltage connected through a resistor 210 with a capacitor 212 providing noise filtering.

An output voltage from the amplifier 88 appears at a terminal 212 which is tied to the comparator circuit 371L. With reference to FIG. 11, the terminal 212 (as part of the circuit 371U) is tied to a terminal 214 (as part of the circuit 371L) to apply the output of the amplifier 88 from the current 371U through a resistor 216 to the input of the amplifier 90 for the circuit 371L. Also connected to the input terminal of the amplifier 90 is the output of the amplifier 88 through a resistor 218. The voltage at the input terminal of the amplifier 90 is clamped at a preselected maximum level by a Zener diode 220. The circuitry for the amplifier 90 is essentially the same as the circuitry for the amplifier 86 of the circuit of FIG. 9 and includes potentiometers 176 and 178 in a feedback loop. The positive DC driving voltage for the amplifier 90 is provided through the resistor 164 and maintained at a level by the Zener diode 166 in parallel with a capacitor 168. The negative DC voltage for the amplifier 90 is provided through the resistor 170 and maintained at a preselected level by the Zener diode 172 in parallel with the capacitor 174. The output waveform of the amplifier 90 varies as shown by the curve 222 at an output terminal 224. The output terminal 224 for the circuit 371L is the raw data signal coupled to the logic 58.

Referring again to FIG. 8, the circuit of FIG. 11 when utilized for the circuit 370 has the background areas A and C of the zone Z3 providing light to the reading means 17A and 17C and the code area B of the zone Z3 is coupled to the reading means 17B. The output voltage Z3 of the amplifier 84 is coupled to the circuit 92 as part of the input for the amplifier 94 to generate the full bar centroid high signal. The output of the amplifier 90 for the circuit 370, as appearing at the terminal 224, is the raw data signal coupled to the logic 58. For the circuit 371U, the output of the amplifier 84 is connected to the circuit 92 as an input to the amplifier 94 for connecting the half bar centroid high signal. The output voltage of amplifier 84 for the circuit 371U is also coupled to the amplifier 184 for the comparator circuit 372 of scanning zone Z5. For the circuit 371U, the output of the amplifier 88, at the terminal 212, as explained, is connected to the terminal 214 of the circuit 371L. The output terminal 224 of the circuit 371U is not utilized. For the circuit 371L, the output of the amplifier 84, as appearing on the terminal 198, is connected to the resistor 186 (FIG. 10) for the circuit 372 covering scanning zone Z5.

Figure 12A:
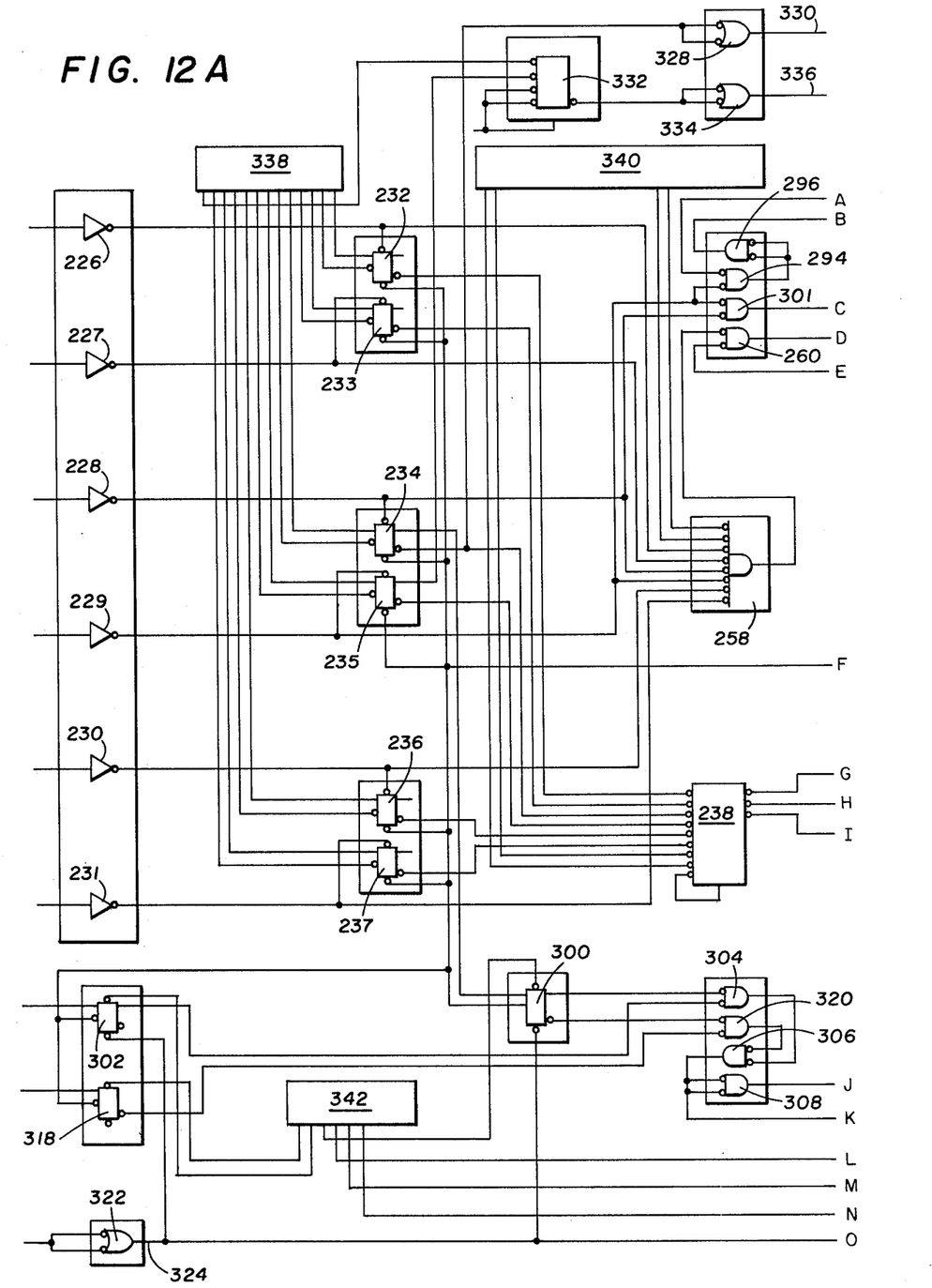
FIGS. 12A and 12B are logic diagrams of the acquisition, tracking and reading logic of FIG. 5.
Figure 12B:
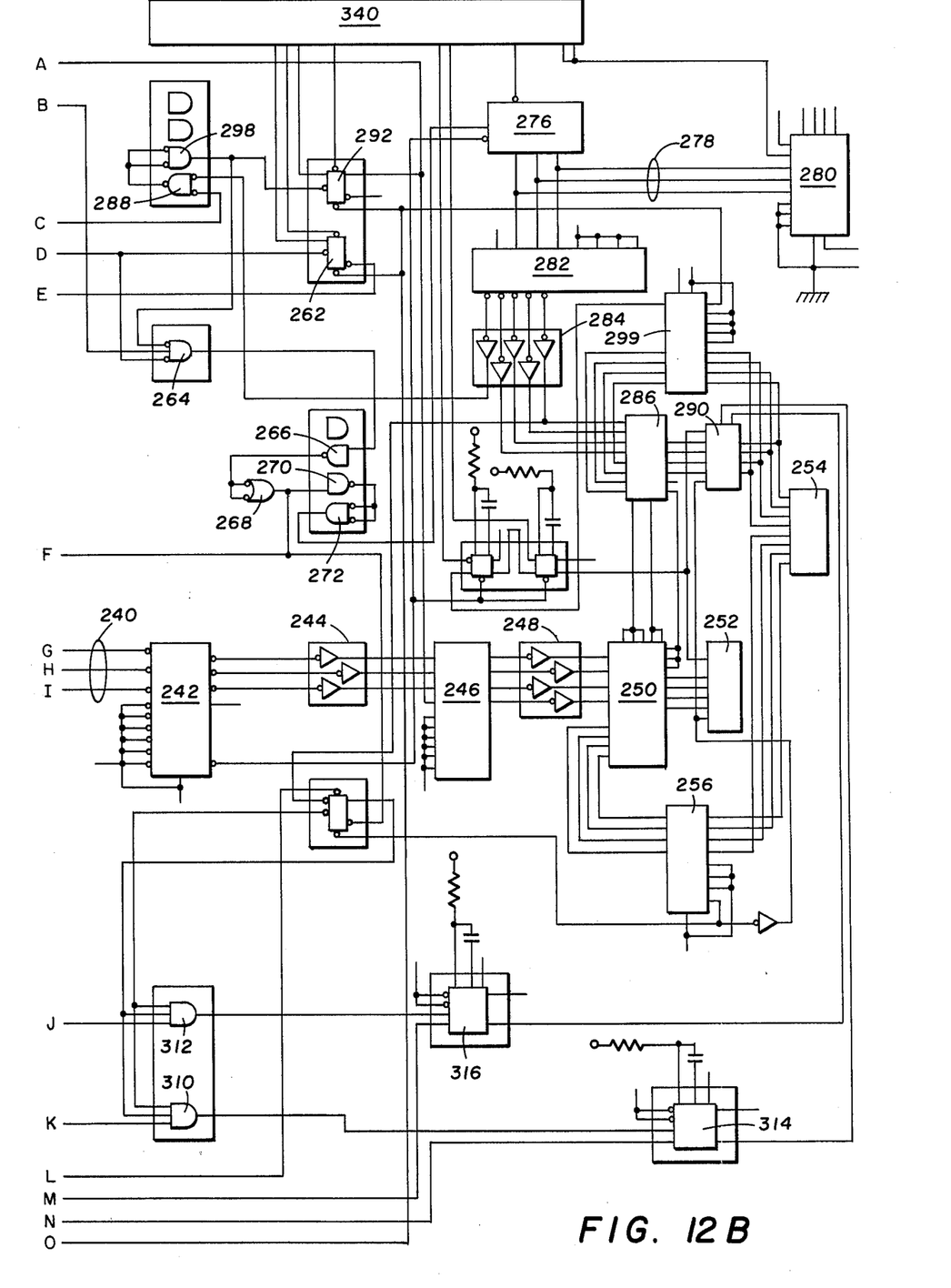

Referring to FIGS. 12A and 12B, there is shown a logic schematic for the acquisition, tracking and reading logic 58 and the deflection logic 64 including six buffer inverting amplifiers 226-231 coupled in order to the signals BZ1-BZ6 from the comparator circuits of FIG. 8. Each of the inverting amplifiers 226-231 has an output respectively coupled to flip-flops 232-237. As a bar code moves through the window area 76, one or more of the flip-flops 232-237 will be set by a change in state of the BZ signal associated with the code zone for that flip-flop. Considered as a complete code, the logic output of the flip-flops 232-237 are coupled to input terminals of a priority encoder 238 to generate a digital code on the lines 240 identifying the top most scanning zone through which the lower portion of a bar code is passing through the window area 76. This code on the line 240 sets a quadrature latch 242 that functions as a storage of the bar code position upon resetting of the priority encoder 238. The priority encoder 238 returns to a quiescent state when resetting the flip-flops 232-237.

A code stored in the quadrature latch 242 is coupled through inverting amplifiers 244 to address a read-only-memory 246. The digital code coupled to the read-only-memory 246 addresses the various storage locations to provide a particular deflection code through inverting amplifiers 248 to a shift register 250. The shift register 250 is set and generates an output for setting a counter 252 that produces a digital output to a converter 254. The converter 254 generates an analog deflection voltage to the vertical deflection coil 38 of the image intensifier tube 10. The output of the counter 252 is also applied to a quadrature latch 256 to generate a base count for initially setting the shift register 250.

As a bar code first enters the window area 76, the flip-flops 232-237 are set and generate a signal through the priority encoder 238 related to the position of the bar code in the viewing window. This code is used to address to the read-only-memory 246 that outputs a code to a register 250 to set a counter 252. The value within the counter 252 is coupled through the converting 254 to energize the deflection coils 38 thereby repositioning the window area 76 of the image intensifier tube 10 such that the bar code appears closer to the center of the window.

Depending upon the initial location of the first bar, the first correction may be insufficient to center the code in the viewing window. To provide additional vertical correction, the horizontal deflection coils of the image intensifier tube 10 are also energized to allow the first bar to again pass through the viewing window.

The output of each buffer amplifier 226-231 is connected to one input of a multiple input OR gate 258 that changes logic levels at the output whenever a bar code enters the window area 76 and returns to the original logic level after a bar has passed through the window. This last change in logic level back to the original state is utilized in the system as a clock pulse to generate a reset signal to the flip-flops 232-237. An output of the OR gate 258 couples to one input of a NAND gate 260 having an output tied to a flip-flop 262 and a NAND gate 264. The output of the NAND gate 264 is tied to one input of a NAND gate 266 having an output connected to an OR gate 268. The output of the OR gate 268 couples through a NAND gate 270 to a NAND gate 272 that generates a clock pulse on a line 274. The output of the OR gate 268 is the reset signal to the flip-flops 232-237.

Clock pulses on the line 274 set a quadrature latch 276 that produces an output code on lines 278 applied to a converter 280 having an analog output for energizing the horizontal deflection coil 38 of the image intensifier tube 10. The magnitude of the analog voltage applied to the deflection coils 38 is sufficient to position the viewing window area 76 such that the first bar code again passes through the window.

An output code provided by the latch 276 is also tied to a shift register 282 having an output coupled through inverting logic 284 to a shift register 286 as part of the vertical deflection counter system. One output of the register 282 connects to NAND gates 288 and 290 to generate a reset pulse to the clock pulse generating logic. An output of the NAND gate 290 is connected to a flip-flop 292 which has one output line tied to a NAND gate 294 in series with a NAND gate 296 coupled to the NAND gate 264.

Returning to the shift register 286, as mentioned, this is part of the vertical deflection logic and includes a counter 298 set by an output from the shift register 286. The shift register 286 and the counter 298 are coupled respectively to the shift register 250 and the counter 252 to form a composite shift register and counter. Counter 298 couples to the converter 254 to be combined with the output of the counter 252 to generate the vertical deflection voltage to the deflection coils 38. An output of the contact 298 is also tied to a quadrature latch 299 for storing a previous count to set the shift register 286 to an initial level.

On the first pass of a bar code through the window area 76, the output of the converter 254 adjusts the position of the viewing window to center the bar code and the output of the converter 280 generates a signal to the deflection coils to horizontally shift the viewing window 76 to allow the first bar code to again pass through the viewing area of the intensifier tube 10. The initial bar code then makes another pass through the window area 76 again setting the flip-flops 232-237 to produce a code in the priority encoder 238 related to the highest zone containing the lower most portion of the bar code. This new position code again addresses the read-only-memory 246 to set the counter 252 to generate another deflection voltage to the coils 38.

During this second pass, the OR gate 258 again responds to the outputs of the amplifiers 226-231 to generate a horizontal deflection voltage from the quadrature latch 276 through the converter 280. The shift register 282 is again stepped to advance the shift register 286. Each time the shift register 282 is set after the first pass, the number set into the shift register 286 decreases on the order of 16, 8, 4, 2 and 1. In effect, this reduces the deflection voltage change generated by the converter 254 by a factor related to the number of passes the initial bar makes through the viewing window. Thus, the contribution of the counter 298 to the voltage output of the converter 254 reduces asymptotically with each pass.

Assuming that additional passes are required to center the window area 76 on the bar code, the deflection coils 38 will be energized to again vertically and horizontally move the window to allow the bar code to pass through the center thereof. Although five passes are possible with the logic system of FIGS. 12A and 12B, in practice a bar code has been centered after the second or third pass through the window.

After the window area 76 has been adjusted to pass the bar code through the reading zone, one additional horizontal deflection is made before initiating the reading sequence. With the bar code passing through the reading zone, the output of the inverting amplifier 228 and the output of the inverting amplifier 229 are connected to inputs of a NAND gate 301 in the logic chain for generating the horizontal deflection signal from the converter 280. With both inputs to the NAND gate 301 at the same logic level, the output thereof inhibits further horizontal positioning of the window area 76. This permits the code to pass through the window and each bar is then read and detected.

With the code properly oriented in the window, an output of the flip-flop 234 sets a flip-flop 300 as part of logic for continuously applying a vertical adjustment to the window area 76 to provide for any skew of the code on the document or skew of the document in the transport system 34.

As a full bar code moves through the reading zone of the window 76, an output of the comparator circuit 374 sets a flip-flop 302 having an output tied to a NAND gate 304 in series with a NAND gate 306. The NAND gate 306 ties to both inputs of a NAND gate 308 and to one input of a NAND gate 310. An output of the NAND gate 308 couples to the shift registers 250 and 286 and to one input of a NAND gate 312. Depending on the output of the comparator circuit 374, either the NAND gate 310 or the NAND gate 312 generates a logic signal for controlling the vertical deflection of the window area. An output of the NAND gate 310 sets the vertical deflection when the center of the full bar code is above the center of the reading zone and must be adjusted downward. The output of the NAND gate 310 couples through delay logic 314 to the counter 298. This changes the count in the counter 298 by one count to lower the output of the converter 254 to appropriately adjust the voltage to the deflection coils 38 to adjust the position of the window area 76. If the position of the bar code is low, then the output of the NAND gate 312 generates a logic signal through a delay 316 to an input of the counter 298. This adds one count to the total in the counters 252 and 298 to change the deflection voltage at the output of the converter 254 to raise the window area 76.

As a half bar code moves through the reading zone of the window area 76, an output of the comparator 375 sets a flip-flop 318 having an output coupled to a NAND gate 320 in series with the NAND gate 306. From the NAND gate 306 the half bar code logic is the same as the full bar code logic and functions as described. Thus, for each passage of either a half bar code or a full bar code through the window area, the vertical position of the window is adjusted either up or down depending on the position of the code in the window.

At the completion of a complete bar code series passing through the window area, a signal is applied to a NOR gate 322 to generate a reset signal on a line 324 to return the system to a ready state to receive and read another bar code.

To generate a train of logic pulses relating to the full bar and half bar codes passing through the window area 76, an output of the flip-flop 234 is coupled to a NOR gate 328 to generate a change in logic levels on a line 330 for each full bar code passing through the window in the reading zone. An output of the flip-flop 235 is coupled through delay logic 332 to a NOR gate 334 having an output that changes logic levels each time a bar code, either a half bar or a full bar, passes through the window area. These timing pulses appear on an output line 336. Both the lines 330 and 336 connect to either a visual display and/or control circuitry to initiate a particular control function in response to a bar code sequence. Each time the logic level on the lines 330 and 336 change state, a full bar is passing through the window area. If only the logic level of the line 336 changes states, there is a half bar passing through the window. Thus, only a full bar produces a change in logic level on the line 330.

To maintain the correct logic levels on the various components of the system of FIGS. 12A and 12B, resistor networks 333, 340 and 342 are included in the system. Each of these blocks consists of a network of parallel resistors coupled to a voltage source for maintaining the correct voltage level on unused terminals of the various logic components. This is in accordance with standard logic circuit design.

The embodiments of the present invention in which an exclusive property or privilege is claimed are defined as follows:

1. A recognition apparatus for reading encoded data carried by an object moving with respect to a reading station, along a travel path, the recognition apparatus comprising:

reading means for reading the encoded data, said reading means being responsive to the encoded data for providing first, second and third data signals which vary correspondingly in magnitude with the encoded data, said reading means including means effective to time displace said second and third data signals from said first data signal by predetermined amounts, said reading means further including amplification means responsive to said first, second and third data signals for providing first, second and third electrical signals, respectively, said amplification means being operable to vary the magnitude of said second data signal relative to said first and third data signals;

summing means connected to said amplification means, said summing means being operable to sum said first and third electrical signals to provide a combination signal representative thereof; and difference determining means connected to said summing means and said amplification means, said difference determining means being responsive to said combination signal and said second electrical signal to provide an output signal representative of the difference therebetween, said output signal being related to said encoded data.

2. The apparatus as set forth in claim 1 wherein said difference determining means comprises a differential amplifier device having inverting and non-inverting input terminals and an output terminal, said combination signal being applied to one of said input terminals and said second electrical signal being applied to the other of said input terminals.

3. The apparatus as set forth in claim 2 and further including means for applying said second electrical signal to said inverting input terminal of said differential amplifying device.

4. The apparatus as set forth in claim 2 and including means for applying said second electrical signal to said non-inverting input terminal of said differential amplifying device.

5. The apparatus as set forth in claim 1 wherein said reading means comprises first, second and third juxtapositioned light sensing devices for providing said first, second and third data signals, respectively.

6. The apparatus as set forth in claim 5 wherein the encoded data is in the form of a series of bars and spaces, said first, second and third light sensing devices each including means for defining first, second and third light responsive areas, respectively, said apparatus further including means for imaging the encoded data on said light responsive areas, the dimension of said second light responsive area along an axis parallel to the travel path being substantially equal to the dimension of an imaged bar along an axis parallel to the travel path.

7. The apparatus as set forth in claim 6 wherein the dimension of said first and third light responsive areas along an axis parallel to the travel path are substantially equal.

8. The apparatus as set forth in claim 7 wherein said dimension of each of said first and third light responsive areas is greater than said dimension of said second light responsive area.

9. The apparatus as set forth in claim 7 wherein said dimension of each of said first and third light responsive areas is substantially equal to said dimension of said second light responsive area.

10. The apparatus as set forth in claim 7 wherein said dimension of each of said first and third light responsive areas is less than said dimension of said second light responsive area.

11. The apparatus as set forth in claim 1 wherein said reading device comprises a single light responsive element defining a single light responsive area.

12. The apparatus as set forth in claim 11 wherein said single light responsive element is responsive to said encoded data to provide said first data signal, said reading device further including time delay means responsive to said first data signal to provide said second and third data signals, said second and third data signals being derived from said first data signal and substantially identical thereto but being sequentially time displaced from said first data signal.

13. The apparatus as set forth in claim 12 wherein said time delay means comprises first and second time delay circuits, said first time delay circuit being arranged to receive said first data signal, said first time delay circuit being operable to delay said first data signal by a predetermined time delay and provide at the output thereof said second data signal, said second time delay circuit being arranged to receive said second data signal, said second time delay circuit being operable to delay said second data signal by said predetermined time delay and provide at the output thereof said third data signal.

14. The apparatus as set forth in claim 12 wherein said time delay means comprises first and second time delay circuits, said first time delay circuit being arranged to receive said first data signal, said first time delay circuit being operable to delay said first data signal by a first predetermined time delay and provide at the output thereof said second data signal, said second time delay circuit being arranged to receive said first data signal, said second time delay circuit being operable to delay said first data signal by a second predetermined time delay and provide at the output thereof said third data signal.

15. The apparatus as set forth in claim 14 wherein the delay provided by said second delay circuit is substantially twice the time delay provided by said first time delay circuit.

16. The apparatus as set forth in claim 1 wherein said apparatus includes a plurality of said reading devices at the reading station, said plurality of said reading devices being serially displaced along an axis perpendicular to the axis of travel of said encoded data.

\* \* \* \* \*